May 23, 1950 M. NATH 2,509,164

DRAFTING DEVICE

Filed Oct. 7, 1946

INVENTOR.
Michael Nath

BY

Barnes, Kisselle, Laughlin & Raisch
ATTORNEYS

Patented May 23, 1950

2,509,164

UNITED STATES PATENT OFFICE 2,509,164

DRAFTING DEVICE

Michael Nath, Detroit, Mich.

Application October 7, 1946, Serial No. 701,773

2 Claims. (Cl. 33—41)

This invention relates to a device for use by draftsmen or template makers and it is directed particularly to the provision of a simple, novel device for guiding instruments such as a pencil, pen, or scribing tool, in the making of lines which are related in position to other lines or shapes.

The principal object of the invention is to provide a device which can be employed in making parallel lines with a writing instrument or scribing tool and which may be straight or curved. A multiplicity of parallel lines may be very accurately made, and in the making of such a line the instrument may be shifted back and forth so as to get a retracing and the instrument accurately retraces a line once made. It is an object, also, of the invention to provide a device useful in corners for describing a curve on a radius in the corner of any shape. A device for carrying out the invention is shown in the accompanying drawings:

Figure 1:
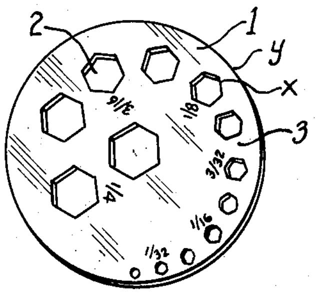
Fig. 1 is a general view of a device constructed in accordance with the invention indicating the same in a slight perspective to show the depth.

The device, itself, is essentially simple in construction and it is preferably in the form of a disc 1 of suitable thickness as indicated. The formation of the device as a disc provides for a substantially universal use in that any portion of the periphery thereof presents a curved surface for application to another guiding instrument. Formed in the disc are a plurality of apertures 2 which have specified and varying distances from the adjacent peripheral edge. As shown in Fig. 1, the disc is provided with twelve apertures. These may, and preferably do, vary in size as indicated. These apertures are preferably of polygonal form and as shown herein are hexagonal in shape. One of the corners of the polygonal form of each aperture is positioned nearest the peripheral edge of the disc. The dimension from the near corner of each aperture to the periphery of the disc is the critical dimension.

The disc advantageously carries suitable indicia as at 3 to indicate these dimensions. Because the device is small, it is thought to be preferable to have indicia applied to every other one to avoid confusion. For example, the second smallest aperture carries the term "$\frac{1}{32}$" and the critical dimension increases $\frac{1}{32}$ for every other aperture as indicated. The intervening apertures have a critical dimension of the intervening $^1/_{64}$. For instance, the critical dimension with respect to the aperture which carries the indicia ⅛, is ⅛ of an inch from the corner $x$ to the surface $y$ of the disc measured on a radial line from the center of the disc. Accordingly, with twelve apertures as indicated, the first eight apertures may progressively increase $^1/_{64}$ of an inch and thereafter the remaining four have increments of $\frac{1}{32}$ of an inch. This, of course, is variable as is also the number of the apertures.

For convenience in use of the tool, the apertures also increase in size. It is not necessary that the apertures increase in size merely because the critical dimensions increase, but such progressively increasing the size of the apertures facilitates a visual use of the tool. Moreover, the increase in the size of the apertures makes it possible to use the tool for the tracing of polygonal shapes on the drawing or template. The center of the disc may be provided with an aperture 4 which may be larger than the others and which may also be used with providing a polygonal shape on the drawing or template.

Figures 2, 3:
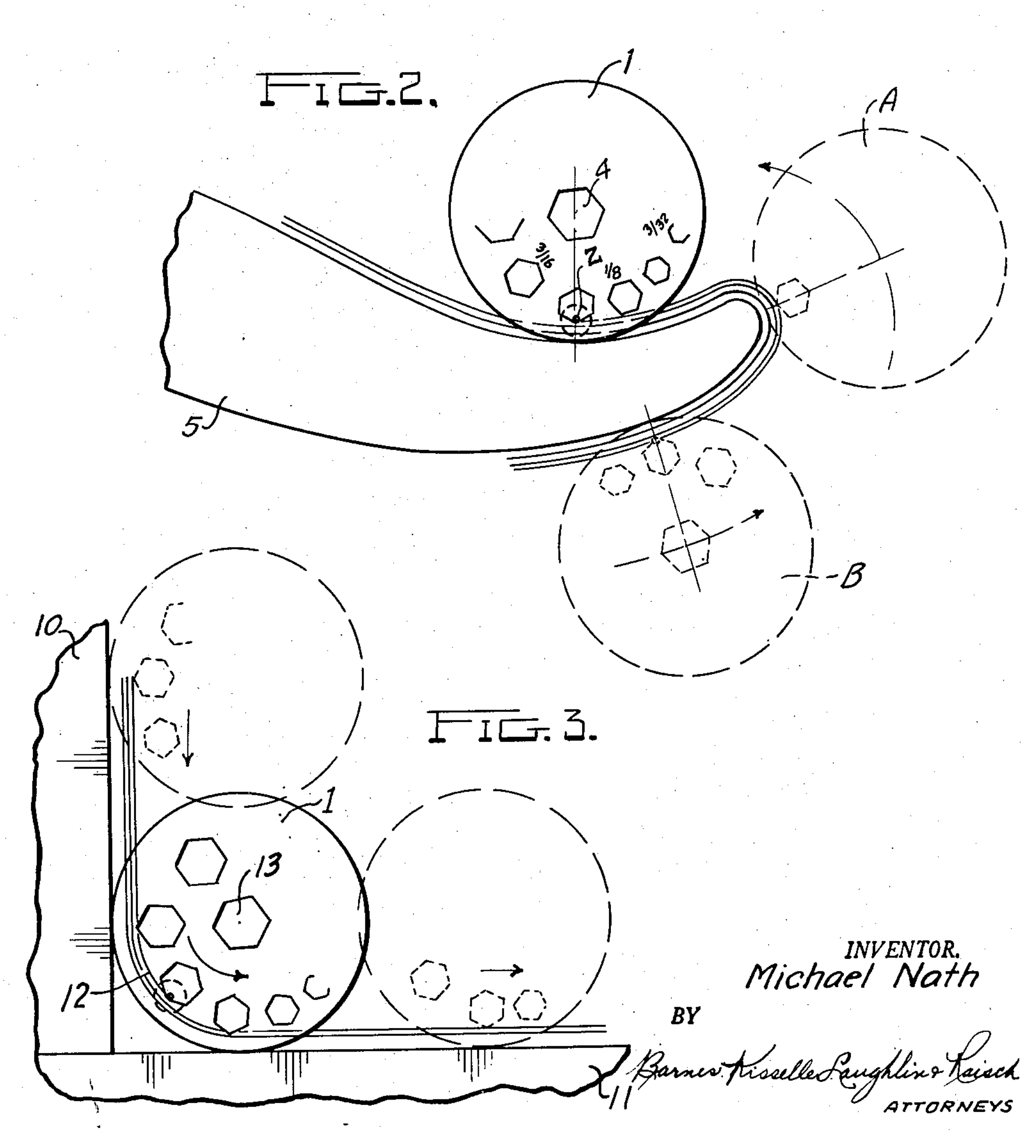
Fig. 2 is a view illustrating how the device is used to provide parallel lines following a sweep.
Fig. 3 is a view illustrating the use of the device and providing a curve on a radius at a corner.

The manner of use of the tool, showing a sweep and the making of a series of parallel lines is indicated in Fig. 2, where the sweep is shown at 5. It might be said that this sweep is an instrument of sheet-like material, such as plastic, which is placed on the drawing and it will be assumed that it is desired to make a plurality or even a multiplicity of lines parallel to the edge of the sweep. The sweep 5 is positioned and held positioned on the drawing and then the point of the pencil or other writing instrument, is placed in the appropriate aperture and the device is manipulated so that the periphery of the disc substantially at the point $y$ engages the edge of the sweep. The pencil is now moved along the surface of the sweep and it is accurately caused to move in a path parallel to the edge of the sweep as the disc moves along the surface of the sweep. To make a plurality of parallel lines the first one may be drawn which, for example, may be only $^1/_{64}$ of an inch from the edge of the sweep, and if increments of $^1/_{64}$ are desired for each line, the next line is made with the second aperture, the third line with the third aperture and so on. As shown in Fig. 2, the parallel lines are not so closely drawn for purposes of clearness. In the use of the tool the point of the pencil is urged toward the sweep to hold the periphery of the disc against the edge thereof and the point of the pencil seats in the corner of the aperture as shown in Fig. 2.

In this use of the tool, there is substantially no rocking of the disc. This is prevented because the shortest distance between the pencil point and the edge of the sweep or guide is on a radial line from the corner $x$ to the point $y$, and any rocking of the disc increases this distance. But since the pencil is urged toward the guide or sweep, the disc is not free to rock. A line once made can be retraced several times by moving the pencil or writing instrument back and forth and the writing instrument will accurately retrace the line.

The device makes it feasible to continue the parallel lines around relatively sharp curves, also as indicated in Fig. 2. In this action, the disc swings about the curve but it is maintained, at any instant, in a position so that a radial line from its center substantially intersects the pencil and an edge of the sweep or guide engaged by the point $y$. This is indicated by the dotted line position A of Fig. 2, and after the disc has moved around the relatively sharp curve, it may take a position as shown by the dotted line position B. The instrument can, therefore, facilitate the making of lines parallel to a concave surface or a convex surface. The concave surface however should be on a radius greater than the radius of the disc.

The use of the tool in making a radius at a corner is shown in Fig. 3. In this figure, there is a suitable guiding device 10 which may be placed upon a drawing, if drafting work is being done, and another guiding device 11 approaches the guiding device 10 at an angle. The devices 10 and 11 may be of unitary construction, such, for example, as a T-square. With the proper opening selected, the pencil is placed therethrough and the pencil with the disc may be moved parallel to the surface 10 and when the disc strikes the edge of the guide 11, its movement is arrested. However, by the pressure applied by the pencil the disc is held in the corner defined by the portions 10 and 11 and it rotates on its axis. Thus a line or scribed mark, as shown at 12, is provided in the corner on a radius measured from the center of the disc at 13 to the corner $x$ of the selected aperture. Finally, as the pencil reaches a position where a radial line from the center of the disc through the pencil point is at right angles to the surface 11 of the guide, the pencil and disc, by appropriate manipulation, can be moved to the right as Fig. 3 is viewed, thus continuing a line parallel to the surface of the member 11.

When the device is to be employed for drafting purposes which usually embodies the use of a pencil for marking on paper, the device may advantageously be made of a suitable plastic. This plastic may be similar or the same as plastic used for other drafting instruments, such as the sweep 5. When the device is to be used in the making of templates or the like, or in any other work where a scribing tool is employed to scribe or scratch a mark on a metal surface, it may be preferable to make the disc of a suitable metal.

I claim:

1. A device for use in drafting or template making comprising, a body having a curved surface formed on a single radius, said body having a plurality of polygonal shaped apertures therein extending along the curved surface, said apertures being positioned so that a corner of the polygonal shape of each aperture is pointed toward and is the nearest portion of the aperture to the curved surface, the said corners of the apertures being spaced different distances, measured radially, from said curved surface, said apertures adapted to receive the point of a marking instrument in the said corners thereof, and said apertures being substantially larger than the point of said instrument whereby the point of said instrument is loosely located therein, the curved surface of the member adapted to engage a guide and adapted to move along the same for guiding the marking instrument in a path in the making of a line parallel to the guide.

2. A device for use in drafting or template making comprising, a circular disc having a plurality of polygonal shaped apertures extending along and adjacent to its periphery, said apertures being positioned so that a corner of the polygonal shape of the aperture is pointed toward and is the nearest portion of the aperture to the curved surface of the disc, said corners of the apertures being spaced different distances, measured radially, from the curved surface of the disc, said apertures being adapted to receive the point of a marking instrument in the said corners thereof and said apertures being substantially larger in cross dimensions than the point of an instrument whereby the point of the instrument is loosely located in an aperture, the curved surface of the disc adapted to engage a guide and adapted to move along the same for guiding the point of the marking instrument in a path in making a line parallel to the guide.

MICHAEL NATH.

REFERENCES CITED

The following references are of record in the file of this patent:

UNITED STATES PATENTS

| Number | Name | Date |
|---|---|---|
| 709,219 | Hochspeier | Sept. 16, 1902 |
| 854,659 | Matthews | May 21, 1907 |
| 1,131,962 | Rogers | Mar. 16, 1915 |
| 1,863,091 | Allred | June 14, 1932 |
| 1,899,318 | Dixon | Feb. 28, 1933 |
| 2,212,703 | Suffich | Aug. 27, 1940 |

OTHER REFERENCES

Popular Science, August 1945, page 165.